United States Patent [19]
Tournier Edmond et al.

[11] Patent Number: 5,276,615
[45] Date of Patent: Jan. 4, 1994

[54] NUCLEAR DETECTION DEVICE ESPECIALLY A GAMMA-CAMERA TYPE DEVICE, WITH DECONVOLUTION FILTERS HAVING AN INVERSE TRANSFER FUNCTION

[75] Inventors: Tournier Edmond, Grenoble; Jean-Jacques Chaillout, St. Etienne de Crossey; Corinne Mestais, Brignoud, all of France

[73] Assignee: Commissariat A L'Energie Atomique, Paris, France

[21] Appl. No.: 743,208

[22] Filed: Aug. 9, 1991

[30] Foreign Application Priority Data

Aug. 10, 1990 [FR] France .................. 90 10257

[51] Int. Cl.⁵ .................. G01T 1/164; G06F 15/42
[52] U.S. Cl. .................. 364/413.24; 250/363.1; 250/580
[58] Field of Search .................. 364/413.13, 413.24, 364/413.23, 413.19; 250/327.2, 369, 484.1, 363; 378/13

[56] References Cited

U.S. PATENT DOCUMENTS

| | | | |
|---|---|---|---|
| 4,455,616 | 6/1984 | Inbar | 364/527 |
| 4,629,895 | 12/1986 | Mestais et al. | 250/369 |
| 4,672,542 | 6/1987 | Roux et al. | 250/369 |
| 4,860,205 | 8/1989 | Jatteau | 364/413.24 |
| 4,881,171 | 11/1989 | Jatteau et al. | 364/413.24 |
| 4,882,680 | 11/1989 | Bonnefoy-Claudet et al. | 364/413.24 |
| 4,900,931 | 2/1990 | Tournier et al. | 280/369 |
| 4,969,095 | 11/1990 | Pauzat et al. | 364/413.24 |
| 5,065,316 | 11/1991 | Tararine et al. | 364/413.24 |

FOREIGN PATENT DOCUMENTS 252566 7/1987 European Pat. Off.
2615961 4/1987 France.

Primary Examiner—Roy N. Envall, Jr.
Assistant Examiner—A. Bodendorf
Attorney, Agent, or Firm—Oblon, Spivak, McClelland, Maier & Neustadt

[57] ABSTRACT

A nuclear detection device, especially a gamma-camera type device which features deconvolution filters. In a gamma-camera variant, the device includes digital filters for deconvoluting electric measuring signals. A transfer function of these filters is opposite that of a circuit having formed the electric signals. It is then possible to separate any pulses which would overlap. Such a system finds particular application in nuclear physics and in particular in the medical field.

10 Claims, 7 Drawing Sheets

NUCLEAR DETECTION DEVICE ESPECIALLY A GAMMA-CAMERA TYPE DEVICE, WITH DECONVOLUTION FILTERS HAVING AN INVERSE TRANSFER FUNCTION

FIELD OF THE INVENTION

The present invention concerns a nuclear detection device, especially a gamma-camera type device and is able to be used in nuclear physics applications for detecting a nuclear radiation and measure from it the spectrum of energy, for example, or may also be used in nuclear medicine applications where the gamma-cameras are used to produce the images of organs into which a radioactive isotope has been introduced.

BACKGROUND OF THE INVENTION

Although the invention is not merely limited to gamma-cameras, this latter type of device shall be described as an example for disclosing the state of the prior art and its drawbacks. The American patent U.S. Pat. No. 3,011,057 issued to H. O. ANGER describes the general structure and functioning of this type of device.

A gamma-camera generally includes a collimator for limiting the angle of incidence of the gamma photons emitted by the organ, a scintillator crystal for transforming the gamma photons into luminous photons, a set of photomultiplier tubes for transforming the luminous photons into electric pulses, and electronic means to transform these electric pulses into signals with the coordinates X and Y.

A gamma-camera also includes a display unit, generally with a cathodic oscilloscope, controlled by the signals with the coordinates X and Y. Thus unit displays the impact point of the gamma photon on the crystal. It may possibly comprise a photographic device so as to form an image of the organ observed by integrating a large number of luminous points. In addition, it may include a device for digitally processing the images. In particular, the image digital processing device may be used to reconstruct images of sections of the organ examined so as to produce tomographies of these organs. In this latter case, image reconstruction algorithms identical to those used in tomodensitometry are used.

By way of example, the accompanying FIG. 1 shows a gamma-camera, such as the one described in the document FR-A-2 615 961.

The gamma photons ($\gamma$) to be detected and localized are emitted by an organ 1. The actual camera includes:
a collimator 2 exposed to gamma radiation,
a film 3 of a scintillator material able to receive the collimated gamma radiation and, by scintillation, produce a luminous radiation 1,
a set of photomultiplier tubes 6 disposed opposed the scintillator, each tube delivering a pulse-shaped electric signal in response to the luminous radiation it has received,
sets of weighting resistors 7 receiving the electric signals delivered by the photomultiplier tubes 6 and delivering four similar electric signals x+, x−, y+ and y− known as "weighted pulses", the two signals x+ and x− expressing the position of scintillation with respect to a first axis X, and the two signals y+ and y− expressing this position with respect to a second axis y,
circuits 8 for transmitting the similar signals x+, x−, y+ and y− and including, for example, a variable gain amplifier, a delay line and a basic potential restoration signal,
integrators 10 of the pulse signals, these integrators delivering the weighted signals X+, X−, Y+ and Y−,
calculation means 20 able to calculate from the weighted signals the coordinates X and Y of a display point corresponding to the scintillation point (s) on the scintillator material; for example, in accordance with the document U.S. Pat. No. 4,672,542, the means 20 calculate the quatities $$X = \frac{X_+ - X_-}{X_+ + X_-} \text{ and } y = \frac{Y_+ - Y_-}{Y_+ + Y_-}$$

a displayer 22 including, for example, a cathodic ray oscilloscope and its horizontal and vertical deviation plates.

The gamma camera shown also includes a circuit 19 connected to the set of weighting resistors and which delivers a signal e reflecting the total energy of the luminous radiation pulse (and no longer the position of this radiation). After passage in an integrator 27, a signal E is obtained reflecting the integrated energy. A threshold comparator 28 delivers a validation signal V used to control the calculation means 20.

it is also possible to extract from the circuit 19 an integration authorization signal I applied to the integrators 10 when the detected energy falls into a required band.

Apart from other factors, a gamma camera shall have:

good spatial resolution, that is a capacity to distinguish small nearby sources,
a good counting percentage response, that is a capacity to process a large number of events per unit of time,
an image quality independent of the energy of the gamma radiation emitted by the isotrope in question.

The spatial resolution depends on the calculation accuracy of the coordinates X and Y. This accuracy in turn depends essentially on physical laws governing the functioning of the various means of the gamma camera. Thus, the interaction of a gamma photon with the scintillator crystal gives rise to a scintillation whose intensity exponentially decreases in accordance with the time involved. The time constant of this decrease is characteristic of the crystal used. For a sodium iodide crystal activated with thallium (NaI, Tl), it is about 300 nanoseconds. This scintillation is simultaneously viewed by several photomultiplier tubes. At a given energy of the incident gamma photon, the number of luminous photons comprising the scintillation obeys the POISSON statistical low. The luminous photons pull up photoelectrons from the photocathodes of the photomultiplier tubes. Also, for a given scintillation, the number of photoelectrons pulled up obeys the POISSON statistical law. The electric contribution of a photomultiplier tube thus follows a POISSON statistical distribution. The mean value of this amplitude depends on the energy of the incident luminous photons.

The determination of the location of the scintillation (representative of the emission site of the gamma photon in the organ observed) is obtained by calculating the center of gravity of the electric contributions delivered by the set of photomultiplier tubes.

For a given scintillation, the most difficult problem to resolve consists of determining as precisely as possible the integral of the center of cavity of the electric contributions over a period of about three times the scintillation decrease time constant. The period of integration depends on the time constant of the crystal. The accuracy of the measurement is tainted with errors due to POISSON statistical fluctuation. In fact, according to the POISSON statistics, the standard deviation of fluctuation of the amplitude of the contributions is inversely proportional to the square root of the number of pulled up photoelectrons. Thus, the longer integration is, that is up to three times the scintillation decrease time constant, the larger is the number of photoelectrons taken into account, the lower is the standard deviation and thus more accurate is any evaluation of the mean value of this contribution.

It shall be observed that the period of integration is directly linked to the quality of the spatial resolution of the gamma camera and that this quality is obtained to the detriment of the counting percentage, that is to the detriment of the number of events taken into account per second.

In many gamma cameras, the integration of signals is embodied similarly, as shown on FIG. 1. When several gamma photons are received during the integration period, they are "stacked", in other words the electric pulses corresponding to them are superimposed, which adversely affects the spatial resolution of the camera. Thus, it is necessary to reject the stacked or superimposed pulses.

A certain number of solutions have been put forward to reject these stacked pulses.

The document U.S. Pat. No. 4,629,895 describes a device comprising, in addition to circuits used to localize scintillations, validation circuits for taking into account scintillations whose amplitude is situated within a predetermined range and which are not followed during the integration period by another scintillation, possibly produced at another location of the crystal, and whose intervention would risk falsifying the localization calculation.

The document U.S. Pat. No. 4,882,680 describes a device for rejecting stacked pulses when the integral of the energy exceeds a certain threshold indicating that a stacking has occured during the integration period.

Other devices use various artifices to subtract any extrapolated or simulated pulse "drags", as described in the documents U.S. Pat. Nos. 4,618,775 and 4,612,443, for example.

It is also possible to use a device for sectioning signals, as described in the document U.S. Pat. No. 4,455,616.

Finally, certain devices use dead time correction circuits, as described in the documents U.S. Pat. Nos. 4,198,986, 4,369,495 and 4,549,866, for example.

However, none of these solutions are satisfactory as they either reject signals and thus degrade the counting percentage performance or subtract any theoretical or extrapolated "drags" or truncate the pulses and then result in degrading spatial resolution.

SUMMARY OF THE INVENTION

The object of the present invention is to overcome all these drawbacks by proposing means making it possible to separate the stacked pulses and calculate their integral accurately and thus improve the counting percentage without degrading spatial resolution.

According to the invention, given the fact that the electric signals $x+$, $x-$, $y+$, $y-$ result in a convolution between the incident gamma pulse and the transfer function of all the means contributing in forming the corresponding electric signals, these signals are deconvoluted by having them transit through a filter whose transfer function is the opposite of that of said means. This deconvolution shall have the effect of separating the stacked pulses. Integration shall then next be effected on the separated pulses.

All these operations for filtering and integration are carried out digitally, which means that the signals to be processed are firstly digitally converted by analog-digital converters. Conversion may be made after the weighting resistors when the latter exist, or even previously where the signals delivered by the photomultipliers are directly digitally coded for a digital processing intended to discover the center of gravity.

In nuclear detection devices which are not gamma cameras, the drawbacks are the same namely that the pulses to be processed are stacked, which adversely affects accuracy of the measurement. For example, the drawing up of histograms then lacks precision.

More specifically, the object of the present invention is to provide a nuclear detection device including means for detecting a nuclear radiation delivering electric pulse signals, means for processing these electric pulse signals so as to determine one characteristic of the nuclear radiation received, this device being characterized in that the processing means include a fast digital-analog converter able to sample each pulse at several points followed by a digital filtering device whose transfer function is opposite that of the means when this filtering device firstly receives the signal, this filtering device being followed by digital integration means and means to determine said characteristics of the radiation.

As already indicated, this nuclear detection device may be of any type. It may possibly be a device for analyzing the energy distribution of a nuclear radiation (spectrometer delivering histograms).

However, the present invention concerns the perfecting of gamma cameras.

In this variant, the gamma camera preferably includes a film of scintillator material able to receive a gamma radiation and by scintillation to produce a luminous radiation, photodetection means disposed opposite the scintillator film and delivering said electric signals, the digital integration means being followed by a circuit for calculating the position of the scintillation.

The processing means preferably include two sets of weighting resistors receiving the electric signals delivered by the photodetection means and delivering four electric pulse signals $x+$, $x-$, $y+$, $y-$, the two signals $x+$, $x-$ expressing the position of scintillation with respect to a first axis X, and the two signals $y+$, $y-$ expressing the position of scintillation with respect to a second axis Y.

Advantageously, the photodetection means are photomultipliers and the gamma camera also includes a gamma radiation collimator placed in front of the film of scintillator material.

BRIEF DESCRIPTION OF THE DRAWINGS

The characteristics and advantages of the invention shall appear more readily from a reading of the following description relating to embodiments, given by way of non-restrictive examples, with reference to the accompanying drawings on which.

DETAILED DESCRIPTION OF THE PREFERRED EMBODIMENTS

Figure 2:
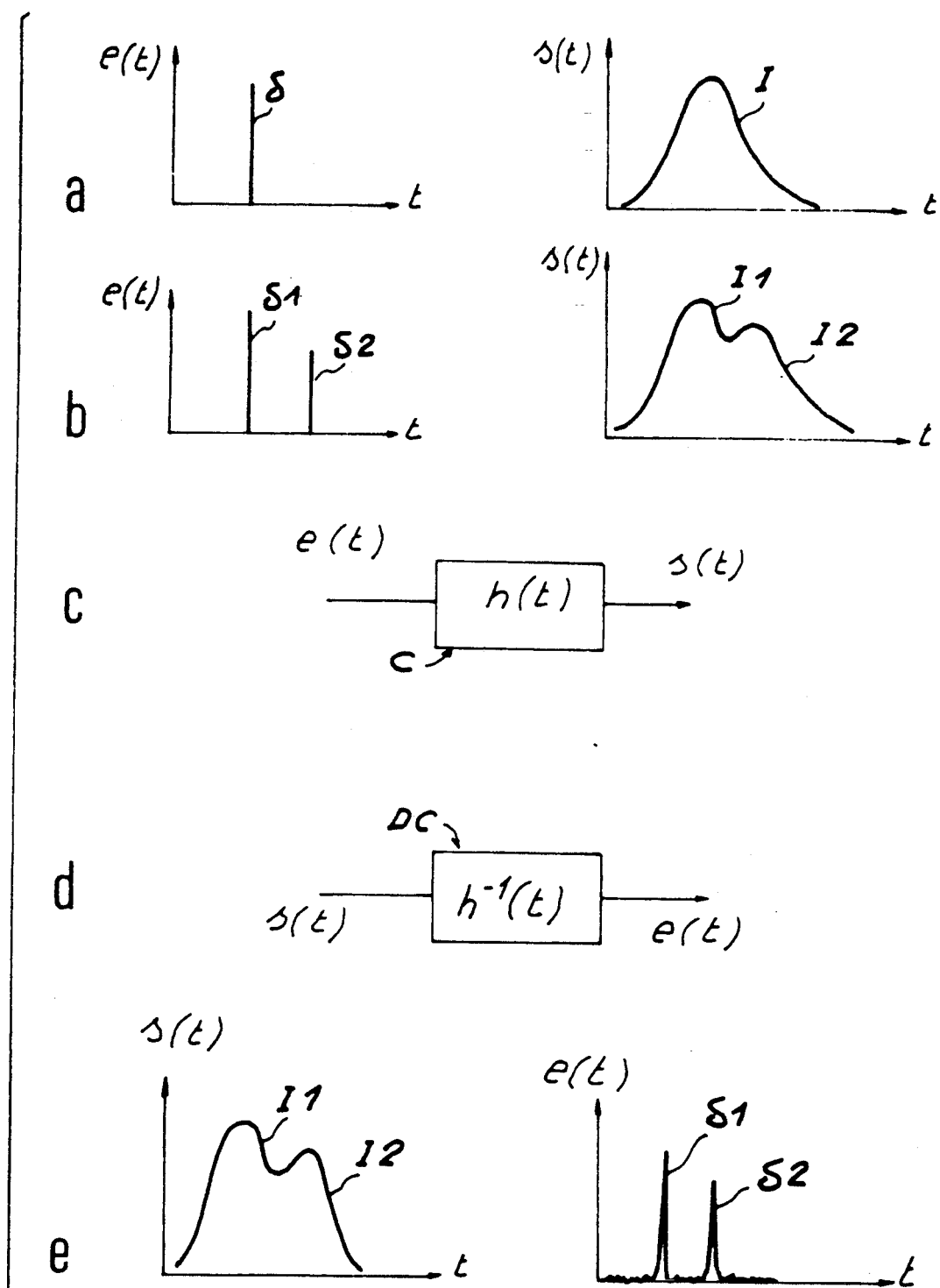
FIG. 2 illustrates the basic principle of the invention applied to gamma cameras.

On FIG. 2 on the left portion of the line (a), there appears a pulse δ representing a gamma photon bombarding a scintillator. The amplitude of this pulse representing the energy of the photon and its width and the duration of the phenomenon. Although this period is not strictly infinite, this pulse may be assimilated with a DIRAC pulse.

This pulse triggers a cascade of phenomena through the scintillator, the photomultiplier tubes, the resistors, the transmission channels and finally gives rise to a signal having the shape of a relatively deployed pulse I (right portion of the line (a)).

The line (b) of FIG. 2 shows two DIRAC pulses δ1 and δ2 which similarly give rise to two pulses I1 and I2. The figure corresponds to the case where the two pulses δ1 and δ2 are sufficiently close so that the two pulses I1 and I2 partly overlap which results in a deformed signal—with "stacking" according to conventional terminology—which is the origin of the difficulties emphasized earlier.

The line c summarizes these phenomena synthetically by considering that the chain of devices extending from the scintillator crystal to the output of the transmission circuits can be represented by a single circuit C having a transfer function h(t). it could be said that the output signal s(t) is the product of convolution of an incident signal e(t) and the transfer function h(t). Thus:

$$s(t) = e(t) * h(t)$$

where the sign * represents a convolution product.

So as to fix the orders of magnitude, it is possible to say that the signals s(t) encountered in most gamma cameras have a period of about one microsecond.

According to the invention, instead of processing the signals s(t) as they appear on the lines a and/or b, they are made to previously undergo a deconvolution operation diagrammatized on the line d. In order to do this, these signals are transmitted by a deconvolution circuit DC whose transfer function is the opposite of the transfer function h(t), namely h−1(t).

Then a compound signal, such as the one of line e and resulting from superimposing the two pulses I1 and I2, shall be broken down into two pulses δ1 and δ2 separated from each other. It is these separated pulses which are to be processed by integration and then by calculation. By way of explanation, it might be possible to separate the stacked pulses having a time shift of 600 ns.

Thus, all the pulses shall be taken into account without any resultant degradation of spatial resolution.

The calculation of the inverse transfer function h−1(t) results from conventional considerations for signal processing. Knowing that the FOURIER transformation of a convolution product is the product of the FOURIER transformations, it is possible to write:

$$S(f) = E(f) \times H(f)$$

where S(f), E(f) and H(f) are respectively the FOURIER transformations of s(t), e(t) and h(t) and where the sign × represents the usual multiplication operation.

Thus, $$E(f) = S(f) \times 1/H(f).$$

With reference again to the convolution product:

$$e(t) = s(t) * TF-1 \, (1/H(f))$$

where TF−1 represents the inverse FOURIER transformed operation.

Thus, the inverse transfer function h−1(t) where 1 is sought is equal to the inverse FOURIER transform of the inverse of the FOURIER transform of the initial transfer function:

$$h-1(t) = TF-1 \, (1/H(f))$$

The convolution of the signal s(t) by h−1(t) shall thus reprovide the initial signal e(t):

$$e(t) = s(t) * h-1 \, (t)$$

Knowing the transfer function h−1(t), the technician is able to embody a digital filter having the appropriate coefficients.

In practice, this filter could be refined by apodizing it. This operation is effected by multiplying 1/H(f) by a function having a value close to one unit for the low and average frequencies and close to zero for the high frequencies. Thus, the high frequencies generally carried by electronic noise are suppressed.

Figure 3:
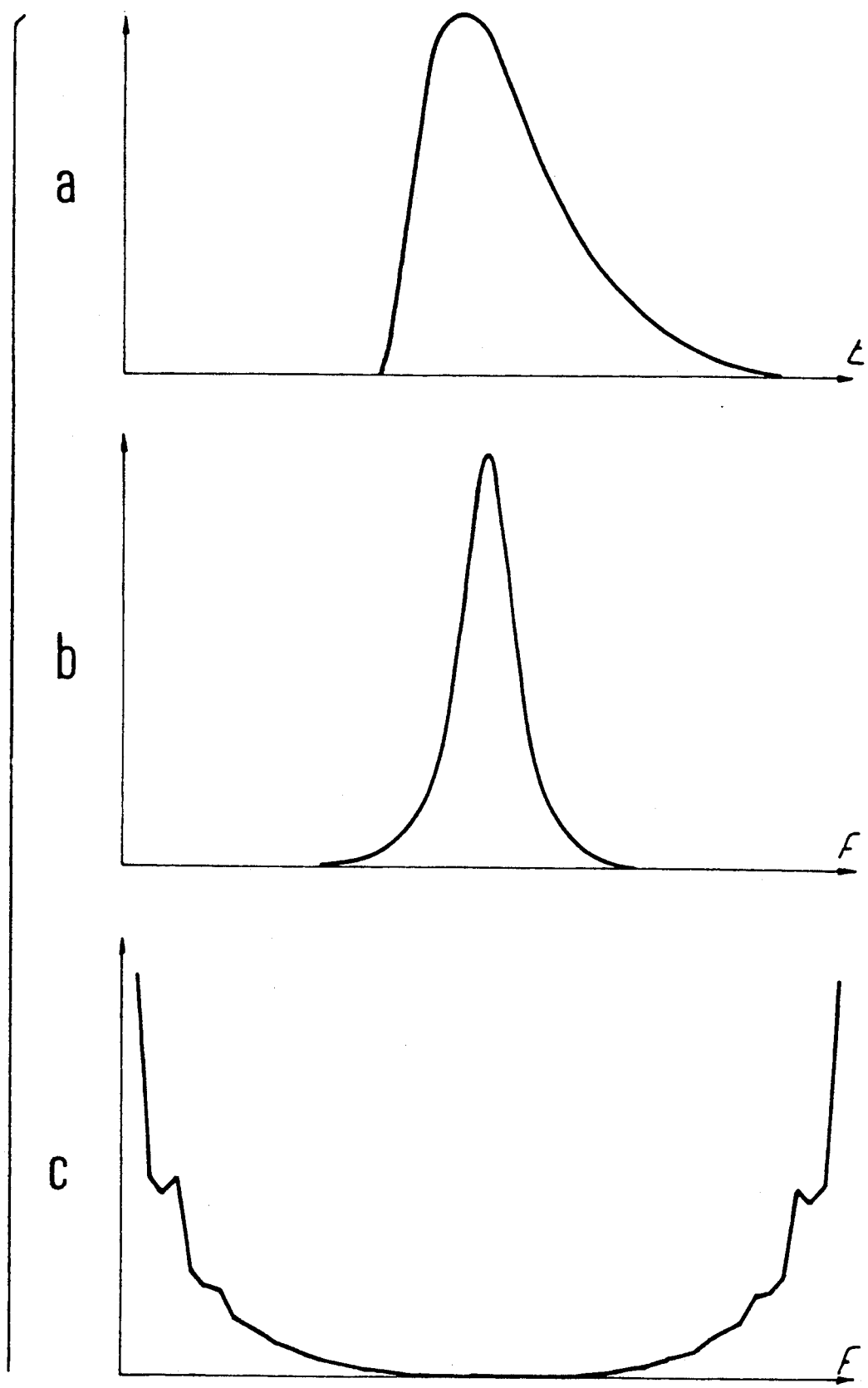
FIG. 3 shows a pulse response, its FOURIER transformation and the opposite transformation.
Figure 4:
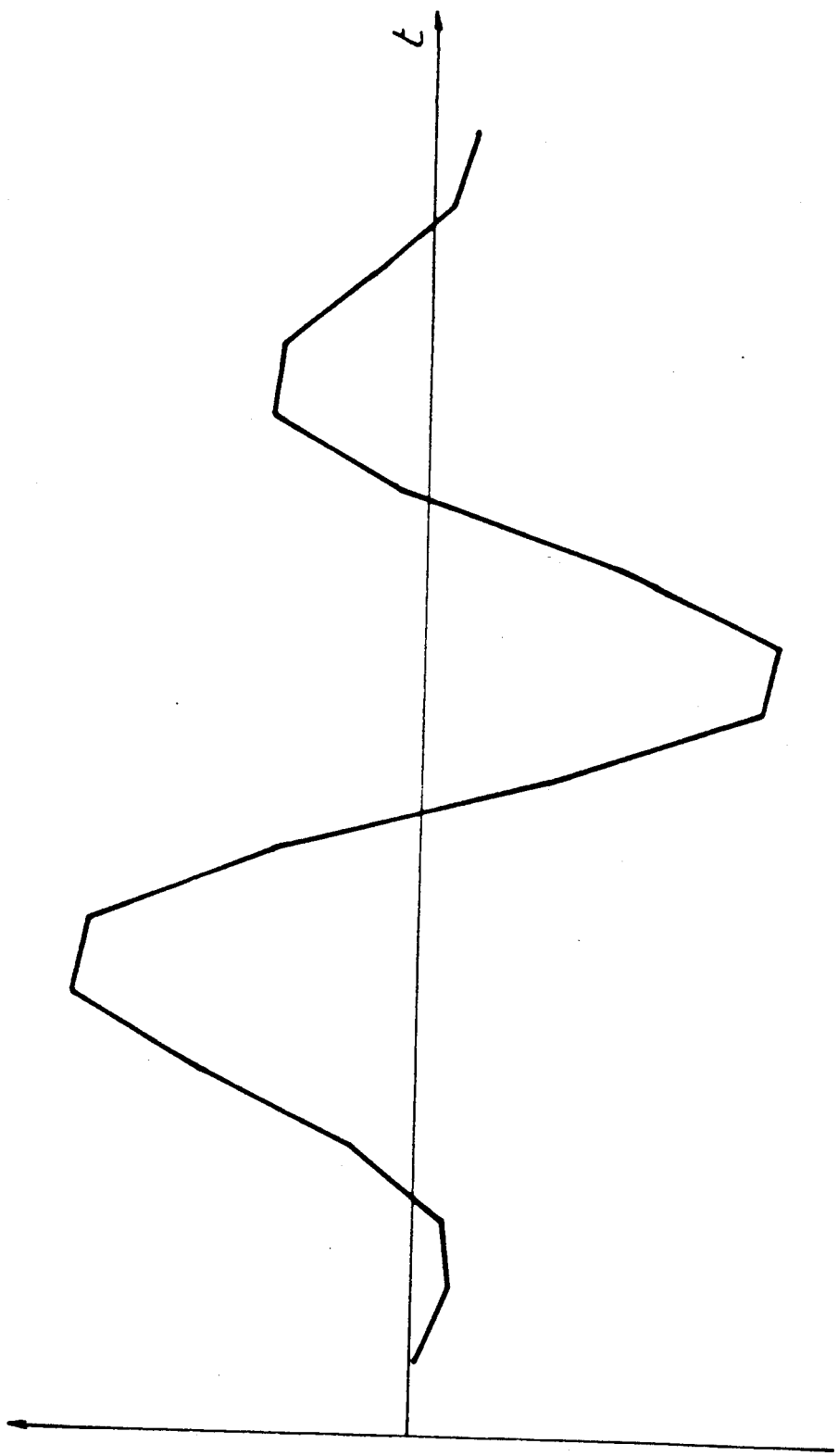
FIG. 4 shows an inverse transformation function.

By simulating signals appearing at various points of the circuits of a gamma camera, the inventors have been able to determine the various functions involved in the invention, these functions being illustrated on FIGS. 3 and 4.

FIG. 3 firstly shows on portion a a transfer function h(t) which expresses the pulse response of the circuits of a gamma camera (scintillator, photomultiplier, resistors, transmission).

Portion b shows the corresponding FOURIER H(f) transform.

Portion c shows the inverse I/H(f).

FIG. 4 shows an inverse FOURIER transform of 1/H(f), namely h−1(t), which is a transfer function of the sought-after filter.

Figure 5:
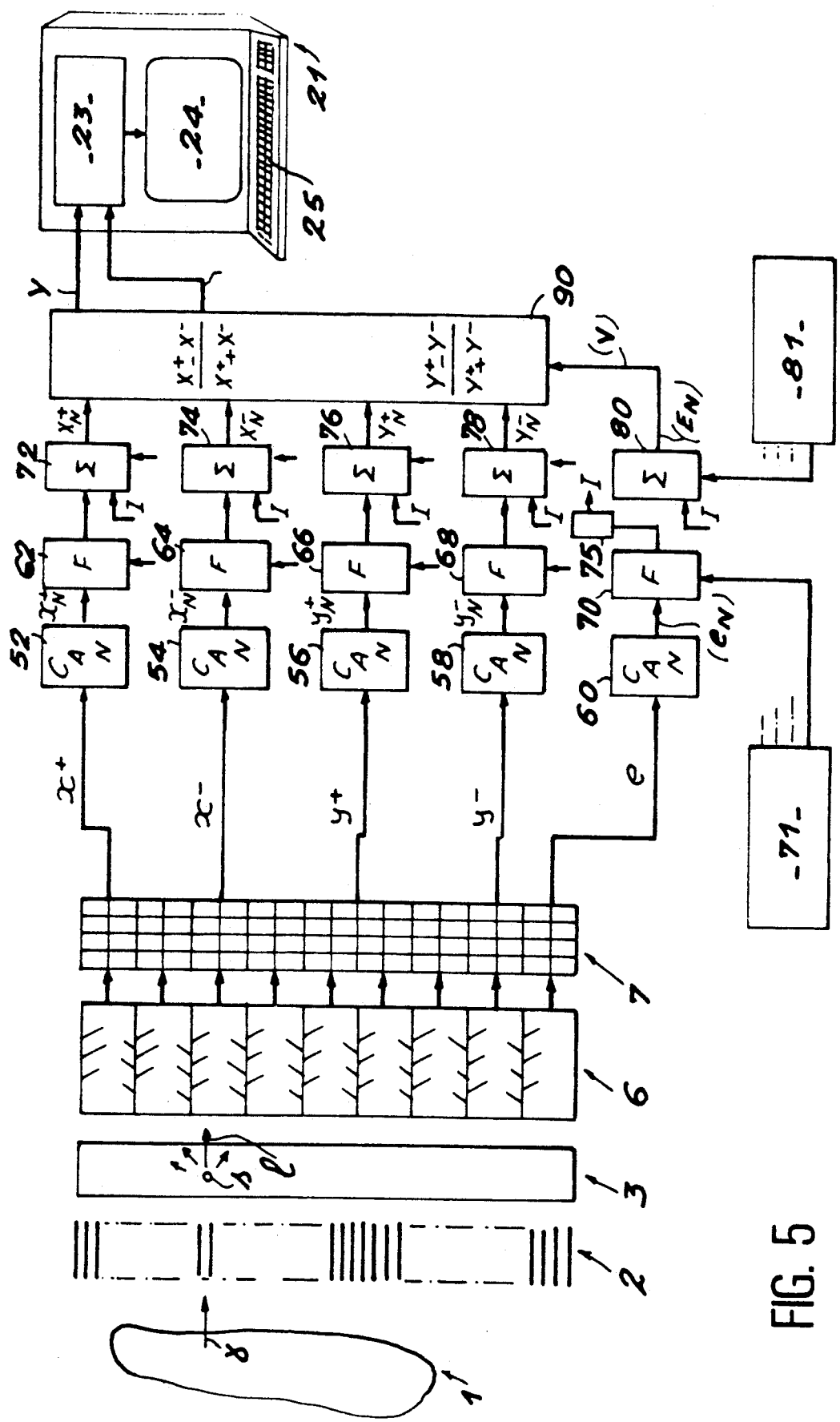
FIG. 5 shows an embodiment of a gamma camera conforming to the invention.

A gamma camera conforming to the invention then appears as shown on FIG. 5. It firstly includes known means, already shown on FIG. 1, namely the collimator 2, the scintillator 3, the photomultiplier tubes 6, the network of resistors and the circuits delivering the signals x+, x−, y+ and y− (reference 7). In accordance with the invention, the gamma camera also includes four fast analog-digital converters (CAN) referenced 52, 54, 56, 58 (or one converter with four inputs and four outputs, which is equivalent), and four digital filters (F) referenced 62, 64, 66, 68 (or a single filter with four inputs) whose transfer functions h−1(t) conform to what was mentioned earlier. These filters are followed by digital integrators (Σ) referenced 72, 74, 76, 78 which deliver sums XN+, XN−, YN+ and YN−.

The coefficients of the digital filters 62, 64, 66 and 68 may be stored in a memory 71, whereas the coefficients of the integrators are stored in a memory 81.

The sums delivered by the integrators are sent to a calculating device 90 which determines the coordinates X and Y, for example (but not exclusively) by the known formulae:

$$X = \frac{XN+ - XN-}{XN+ + XN-} \text{ and } Y = \frac{YN+ - YN-}{YN+ + YN-}$$

These coordinates are finally applied to the display device 21. This device may include an image memory 23, a display screen 24 and a keyboard 25.

The calculation of the coordinates X and Y from the sums XN+, XN−, YN+ and YN− may be effected as described in the document U.S. Pat. No. 4,672,542.

Figure 1:
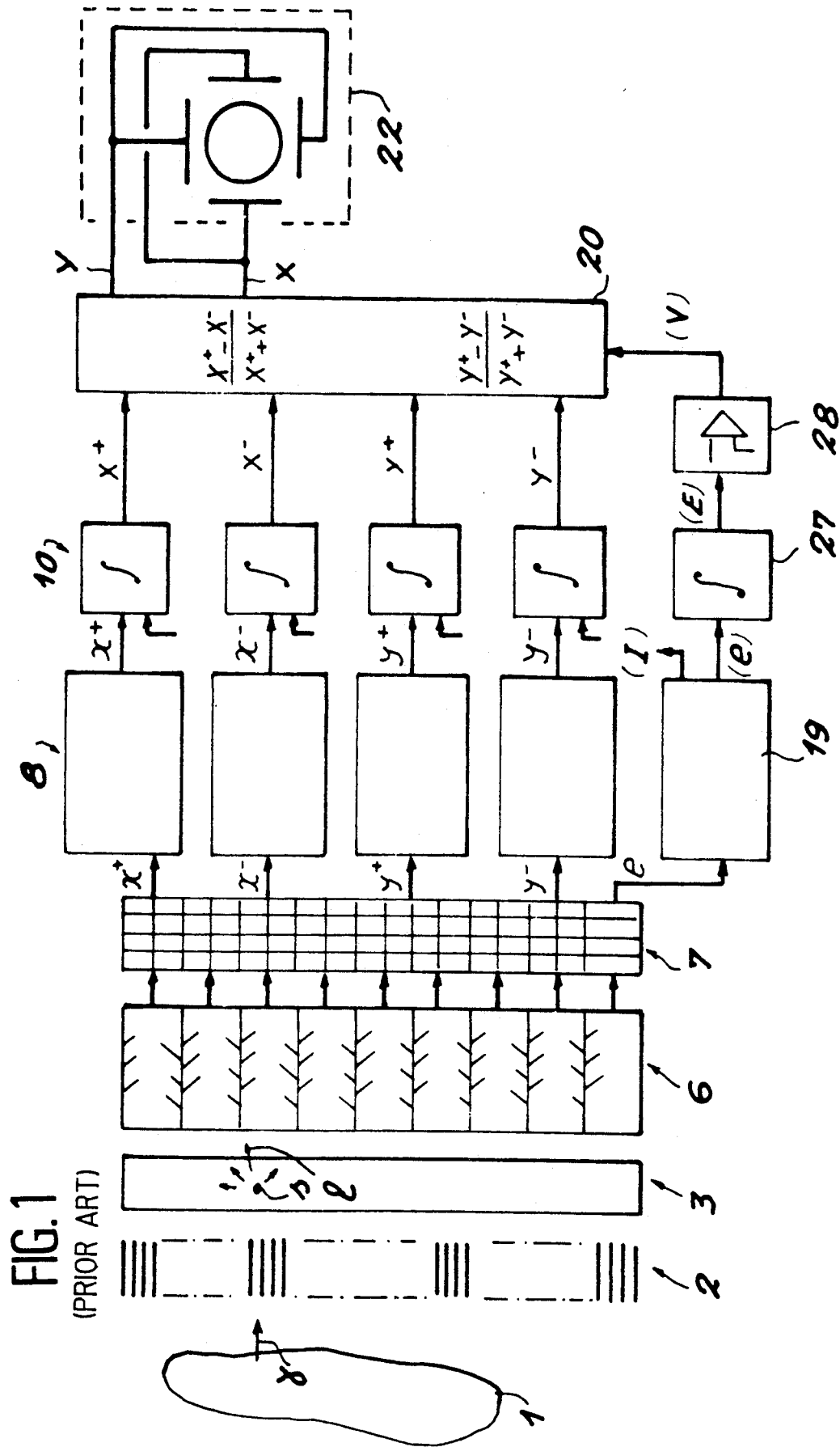
FIG. 1, already described, shows a gamma camera according to the prior art.

As in the case of FIG. 1 relating to the prior art, the gamma camera of the invention may also include a circuit to form a signal e reflecting the energy of the radiation. However, in the case of the invention, the analog signal e is converted into a digital signal eN by a converter 60 and filtered; the maximum amplitude is detected by a circuit 75 so as to validate the integration calculation of the coordinates and the energy (signal I). The energy is then integrated in a digital integrator 80. The sum obtained (EN) is used as a signal V for validating the calculation device 90.

Figure 6:
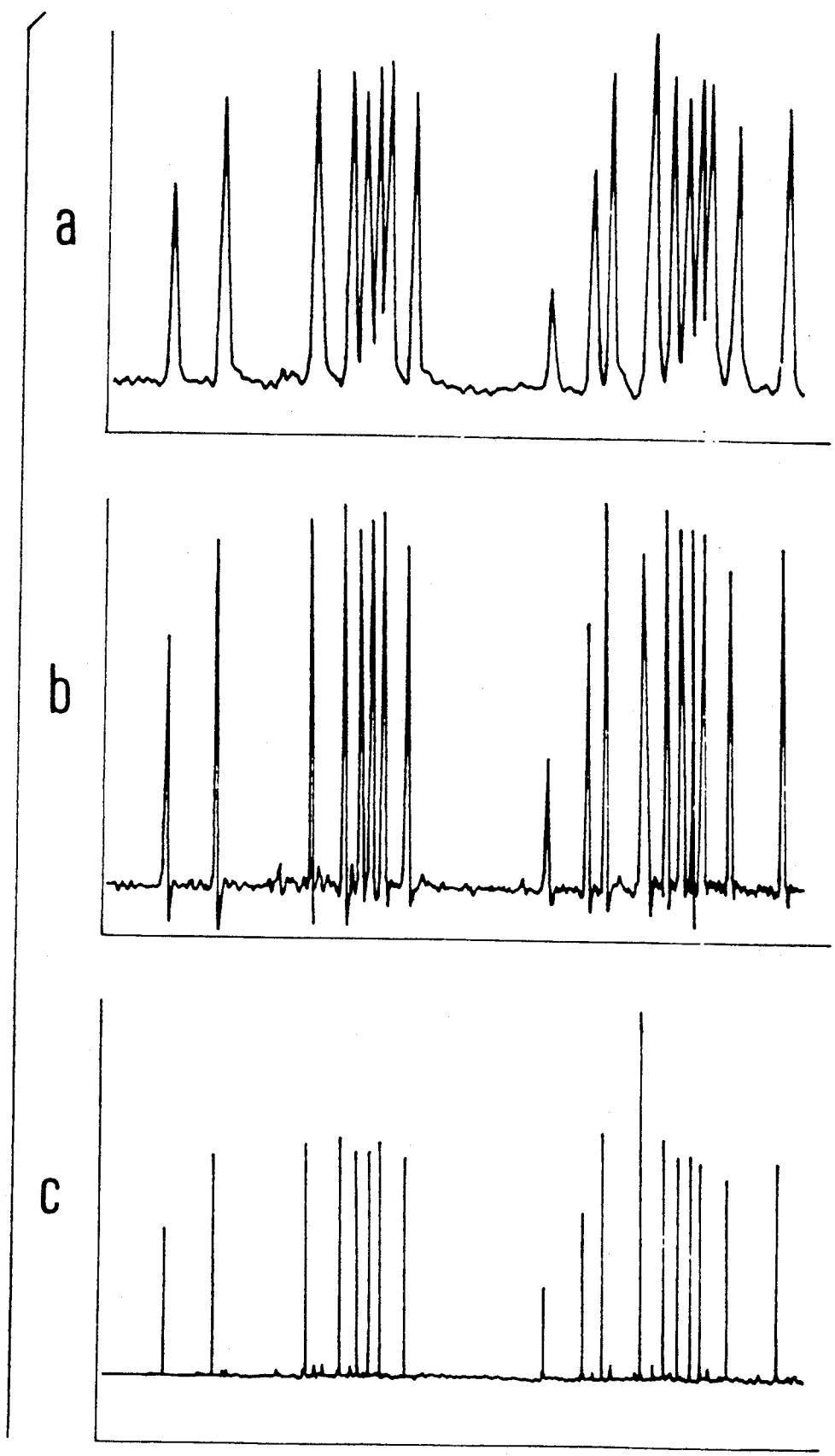
FIG. 6 shows an incident signal, the corresponding filtered signal and the integrated signal.

FIG. 6 makes it possible to assess the results obtained by the means of the invention. Line (a) shows an incident digitalized signal. As the analog pulses have, for example, a period of 1 μs, the fast converters sample these pulses every 50 ns and thus supply about twenty digital samples per pulse. These samples are smoothed on the line (a). Line (b) shows the corresponding signal obtained after filtering and line (c) shows the signal after integration. The pulses overlapping on the line (a) are separated on the line (c).

Figure 7:
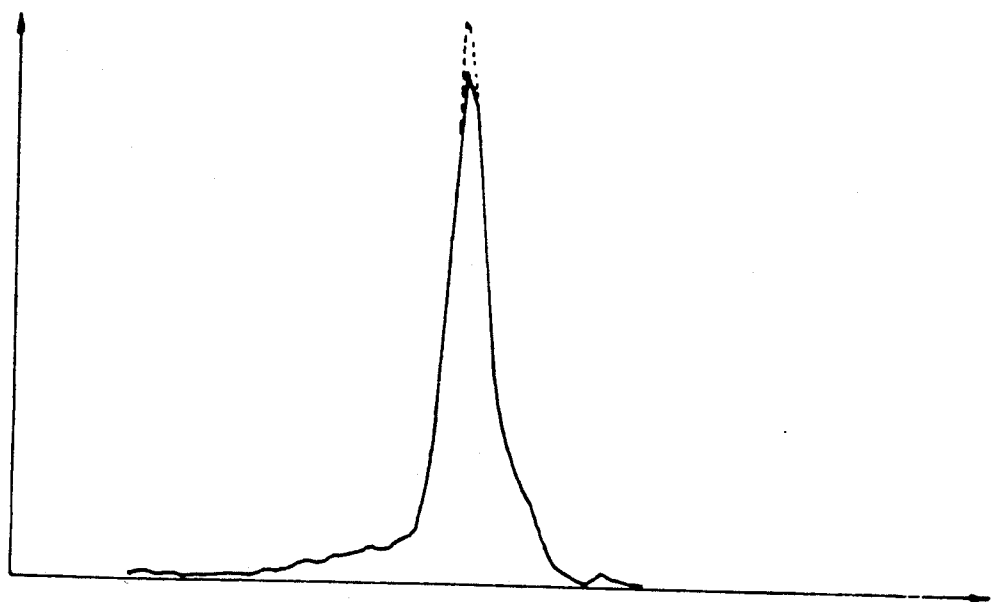
FIG. 7 shows two energy spectrums of non-stacked signals before and after filtering.
Figure 8:
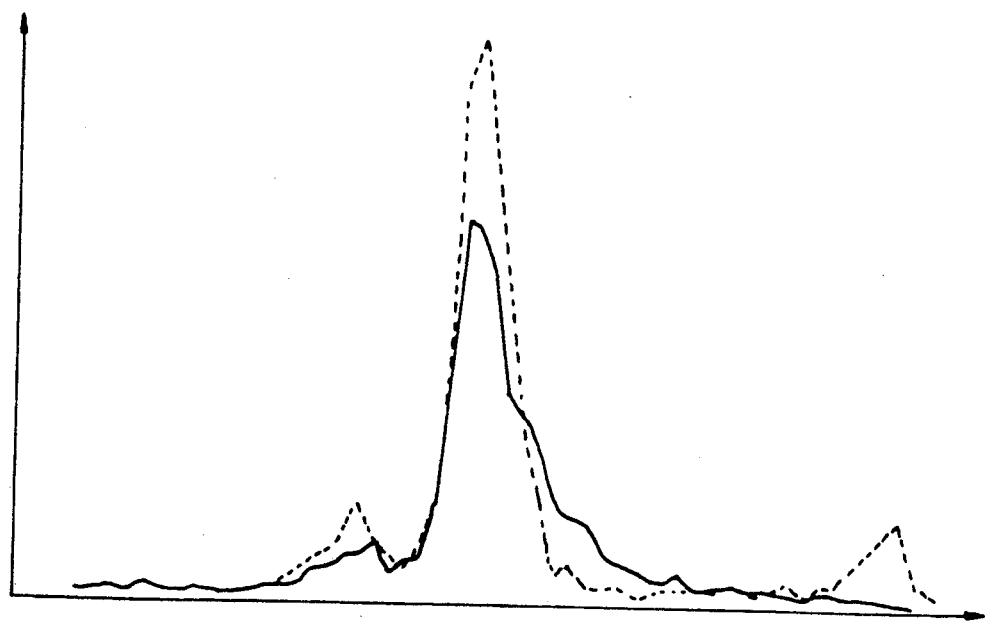
FIG. 8 shows two energy spectrums of stacked signals before and after filtering.

FIGS. 7 and 8 show energy spectrums (number of strokes in ordinates and energy in abscissae). FIG. 7 shows unstacked signals. The full line curve corresponds to the signals prior to filtering and the broken curve to the signals after filtering. These curves show that there is no degradation of the energy resolution for the non-stacked signals.

FIG. 8 shows signals with stacking prior to filtering (full line) and after filtering (broken line). One can readily see an improvement of the energy resolution by virtue of the filtering.

The digital filters used in the invention may be of any known type. It is possible to use matrix multiplier type filters, such as those sold by the TRW company under the reference TMC 2250 or finished pulse response filters.

What is claimed is:

1. A nuclear detection device comprising:
   detecting means for detecting an incident nuclear radiation, the detecting means having a first transfer function;
   at least one fast analog/digital converter for receiving signals output by the detecting means;
   at least one digital filter for receiving signals output by the at least one fast analog/digital converter, the at least one digital filter having a second transfer function approximately opposite to the first transfer function of the detecting means;
   a digital integration means for integrating signals output by the at least one digital filter; and
   a determining means for determining a characteristic of the incident nuclear radiation based on signals output by the digital integration means.

2. The device according to claim 1, wherein the characteristic to be determined by the determining means is a position of the incident nuclear radiation.

3. The device according to claim 2, wherein the detecting means comprises:
   a film of a scintillator material for receiving the incident nuclear radiation, which is gamma radiation, and for generating luminous radiation signals in response to the received nuclear radiation by scintillation, and
   photodetection means disposed opposite the scintillator film for receiving the luminous radiation signals output by the scintillator film; and
   wherein the determining means determines a position of the scintillation.

4. The device according to claim 3, wherein the detecting means further comprises sets of weighting resistors receiving signals output by the photodetection means and for generating four electric pulse signals x+, x−, y+, y−, signals x+, x− expressing the position of the scintillation with respect to a first axis X, and signal y+, y− expressing the position of the scintillation with respect to a second axis Y.

5. The device according to claim 4, wherein the at least one fast analog/digital converter comprises four fast analog/digital converters for respectively receiving the four signals x+, x−, y+, y− from the sets of weighting resistors and wherein the digital filter comprises four digital filters connected to the four fast analog/digital converters and wherein the digital integration device comprises four digital integrators.

6. The device according to claim 3, further comprising an image memory display device for displaying a result of the determining means.

7. The device according to claim 1, further comprising:
   delivering means for delivering a digital signal e(N) representing an energy of the incident nuclear radiation, the delivering means having a third transfer function;
   a further digital filter for receiving the digital signal e(N), this further digital filter having a fourth transfer function approximately opposite to the third transfer function of the deliverying means,
   a detecting circuit for detecting signals output from the further digital filter; and
   a digital integrator connected to the detecting circuit and outputting a signal used for validating the determining means.

8. The device according to claim 7, wherein the detection circuit delivers a signal for validating all the integrators.

9. The device according to any one of claim 3 to 6, wherein the photodetection means comprise photomultipliers.

10. The device according to any one of claim 3 to 6, further comprising a gamma radiation collimator placed in front of the film of scintillator material.

* * * * *

UNITED STATES PATENT AND TRADEMARK OFFICE
CERTIFICATE OF CORRECTION

PATENT NO. : 5,276,615
DATED : January 4, 1994
INVENTOR(S) : Edmond Tournier et al.

It is certified that error appears in the above-indentified patent and that said Letters Patent is hereby corrected as shown below:

On the title page, Item [19] and [75], the first inventor's name should read:

[19]   --Edmond Tournier et al.--

[75]   --Edmond Tournier,--

Signed and Sealed this

Twenty-fourth Day of May, 1994

Attest:

BRUCE LEHMAN

*Attesting Officer*   *Commissioner of Patents and Trademarks*